(12) United States Patent
Stouffer et al.

(10) Patent No.: US 6,288,635 B1
(45) Date of Patent: Sep. 11, 2001

(54) VEHICLE SECURITY SYSTEM

(75) Inventors: Peter Stouffer, Davisburg; Michael Lindsey, Royal Oak, both of MI (US)

(73) Assignee: Code Alarm, Inc., Madison Heights, MI (US)

( * ) Notice: Subject to any disclaimer, the term of this patent is extended or adjusted under 35 U.S.C. 154(b) by 0 days.

(21) Appl. No.: 09/225,931

(22) Filed: Jan. 5, 1999

(51) Int. Cl.⁷ .................................................. B60R 25/10
(52) U.S. Cl. ..................... 340/426; 340/425.5; 340/384.1
(58) Field of Search ........................... 340/425.5, 426, 340/428, 429, 430, 463, 539, 541, 568.1, 571, 572.1, 384.1, 384.4, 825.32, 825.4, 825.45; 307/10.1, 10.2; 704/200, 270, 273

(56) References Cited

U.S. PATENT DOCUMENTS

| | | | |
|---|---|---|---|
| 3,585,584 | 6/1971 | Behrend | 340/430 |
| 3,614,734 | 10/1971 | Davis | 340/428 |
| 3,668,675 | 6/1972 | Joens et al. | 340/426 |
| 3,670,301 | 6/1972 | Douglas | 340/429 |
| 3,703,714 | 11/1972 | Andrews | 340/426 |
| 3,781,854 * | 12/1973 | Kaufman et al. | 340/430 |
| 3,949,219 | 4/1976 | Crouse | 250/229 |
| 3,987,408 | 10/1976 | Sassover et al. | 307/10.5 |
| 4,143,368 | 3/1979 | Route et al. | 340/543 |
| 4,159,467 | 6/1979 | Ballin | 340/539 |
| 4,161,721 | 7/1979 | Conklin et al. | 340/543 |
| 4,258,353 | 3/1981 | Carlson | 340/467 |
| 4,383,242 | 5/1983 | Sassover et al. | 340/429 |
| 4,471,659 | 9/1984 | Udd et al. | 73/655 |
| 4,535,333 | 8/1985 | Twardowski | 340/539 |
| 4,584,569 | 4/1986 | Lopez et al. | 340/566 |
| 4,595,902 | 6/1986 | Proske et al. | 340/825.31 |
| 4,626,848 | 12/1986 | Ehlers | 340/825.69 |
| 4,631,527 | 12/1986 | De Witt et al. | 340/539 |
| 4,652,860 | 3/1987 | Weishaupt et al. | 340/539 |
| 4,701,751 | 10/1987 | Sackett | 340/556 |
| 4,719,460 | 1/1988 | Takeuchi et al. | 340/825.31 |
| 4,754,255 | 6/1988 | Sanders et al. | 340/426 |
| 4,794,368 | 12/1988 | Grossheim et al. | 340/426 |
| 4,837,567 | 6/1989 | Kleefeldt et al. | 340/825.31 |
| 4,862,139 | 8/1989 | Fukamachi et al. | 340/426 |
| 4,866,417 | 9/1989 | DeFino et al. | 340/429 |
| 4,868,915 | 9/1989 | Anderson, III et al. | 340/825.31 |
| 4,887,065 | 12/1989 | Robitschko et al. | 340/430 |
| 4,940,964 | 7/1990 | Dao | 340/438 |
| 4,942,393 | 7/1990 | Waraska et al. | 340/825.31 |
| 4,983,953 | 1/1991 | Page | 340/467 |
| 4,990,906 | 2/1991 | Kell et al. | 340/825.31 |
| 5,012,221 * | 4/1991 | Neulhaus et al. | 340/384 E |
| 5,047,629 | 9/1991 | Geist | 250/231.1 |
| 5,049,867 | 9/1991 | Stouffer | 340/426 |
| 5,113,182 | 5/1992 | Suman et al. | 340/426 |
| 5,132,660 | 7/1992 | Chen et al. | 340/428 |
| 5,134,392 | 7/1992 | Takeuchi et al. | 340/825.31 |
| 5,146,215 | 9/1992 | Drori | 340/825.32 |
| 5,159,334 | 10/1992 | Baumert et al. | 340/825.31 |
| 5,160,850 | 11/1992 | Spirig et al. | 250/559.13 |
| 5,225,672 | 7/1993 | Jones | 250/227.21 |
| 5,245,694 * | 9/1993 | Zwern | 704/200 |
| 5,267,318 * | 11/1993 | Severson et al. | 340/384.3 |
| 5,313,295 | 5/1994 | Taniguchi et al. | 348/149 |
| 5,315,285 | 5/1994 | Nykerk | 340/426 |
| 5,448,218 * | 9/1995 | Espinosa | 340/426 |
| 5,448,221 * | 9/1995 | Weller | 340/539 |
| 5,499,196 | 3/1996 | Pacheco | 702/81 |
| 5,543,776 * | 8/1996 | L'Esperance et al. | 340/426 |
| 5,648,764 * | 7/1997 | Nose et al. | 340/426 |
| 5,682,133 | 10/1997 | Johnson et al. | 340/426 |
| 5,774,858 * | 6/1998 | Taubkin et al. | 704/273 |

FOREIGN PATENT DOCUMENTS

2246232 * 1/1992 (GB) ..................... 340/426

* cited by examiner

Primary Examiner—Van T. Trieu
(74) Attorney, Agent, or Firm—Pepper Hamilton LLP

(57) ABSTRACT

A vehicle security system 10 having a "panic" and/or "alarm tripping" feature which is adapted to allow the activation of a siren/horn/visual indicator in a pseudo-random or "human-like" manner. The system may comprise a portable system to protect an individual or non-automotive object.

6 Claims, 2 Drawing Sheets

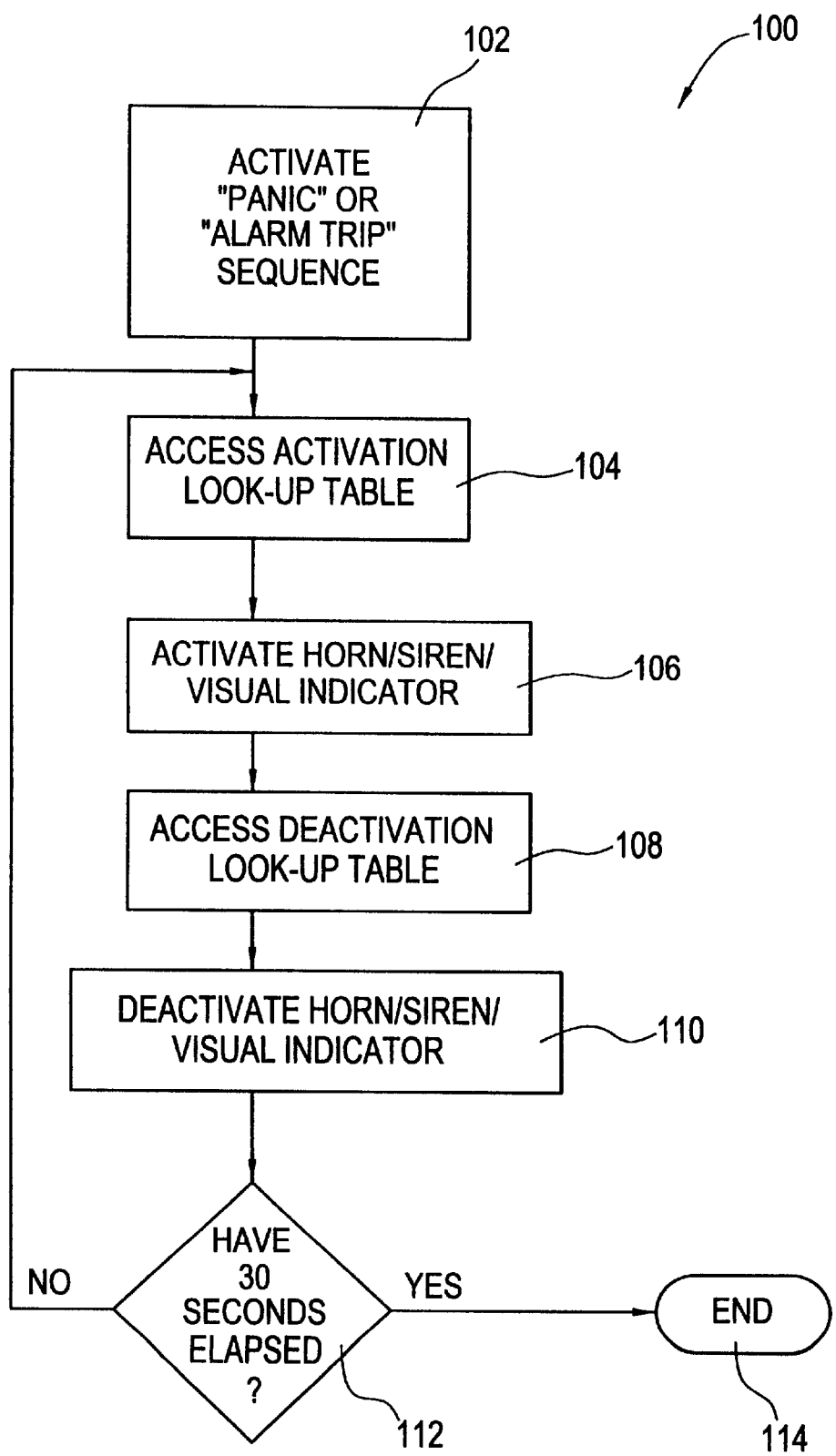

US 6,288,635 B1

VEHICLE SECURITY SYSTEM

BACKGROUND

(1) Field of the Invention

This invention relates to a vehicle security system and more particularly to a vehicle security system adapted to selectively and pseudo-randomly and/or non-uniformly activate a horn or other audible and/or visual alarm in a "human-like" manner in response to a "panic" type signal selectively generated and/or transmitted by a user and/or operator of the security system, or in response to an alarm "trip" condition. This invention also relates to a portable alarm system which may be selectively worn by a person or placed upon an object to be protected.

(2) Background of the Invention

Vehicle security systems are normally deployed within vehicles to prevent and/or to diminish the probability that the vehicle will be tampered with, stolen, and/or destroyed or damaged. While many of these vehicle security systems provide these theft prevention and/or deterrence features, such as disabling the starter of the vehicle when the system is placed into an "armed" mode or condition, they also provide an additional "panic type" feature which allow a user of these systems to selectively activate a siren or other audible device (e.g. the horn of the vehicle) in response to a threatening situation and for the purpose of attracting attention to the vehicle or to the owner/user of the vehicle or security system. For example, a housewife, parked in a supermarket parking lot and "loading" her automobile with groceries, may be accosted by a thief or criminal. By pressing a switch on her vehicle security transmitter, the housewife may cause the siren and/or horn to become activated. Such activation may be sufficient to scare the thief away and leave the housewife safe since a thief or assailant does not normally want to have attention drawn to him. These "panic" features and associated vehicle security systems are described, for example and without limitation, within U.S. Pat. No. 5,049,867 ("the '867 patent") entitled "Vehicle Security Apparatus", which issued on Sep. 17, 1991, which is assigned to Applicants' assignee, and which is fully and completely incorporated herein by reference, word for word and paragraph for paragraph. Additionally, U.S. Pat. No. 5,805,056 ("the '056 patent") entitled "Vehicle Security System", which issued on Sep. 8, 1998 and which is assigned to Applicants' assignee is also fully and completely incorporated herein by reference, word for word and paragraph for paragraph.

While these "panic" features have allowed for the selective generation of substantially uniform "noise" they have generally failed to provide the level or amount of desired deterrence that they have sought. That is, these prior vehicle security systems have, in a "panic" or "alarm trip" situation, provided regularly and/or substantially regularly and/or uniformly timed noise or sound/siren/horn activation. In fact, it is this regularly timed "noise" which is generated and/or transmitted during "false alarms". The noise simply "sounds artificial" and not generated by a human being. In fact, these "false alarms" and the generation of this "artificial" noise have become so commonplace that this uniform and regularly timed "noise" is often ignored, even when truly generated in a threatening "panic" or "alarm trip" type situation. In essence, the "panic" or "alarm trip" generated noise simply doesn't sound like noise generated by a human being in a real life-threatening situation. It sounds "phony".

Accordingly, there exists a need to provide a vehicle security system having a "panic" feature which provides for "real life" and non-uniform sounds which are adapted to attract attention to the vehicle and/or to the person causing the sounds to be generated. There also exists a need to provide such a "panic" feature on or as part of systems that do not comprise vehicle security systems but which may be employed upon a vehicle, a person, and/or upon another object. There is also a need for a vehicle security system or portable security system to provide this improved sound upon the occurrence of an alarm "trip" condition which arises when the security system senses the occurrence of undesired vehicle, individual, and/or object tampering or displacement.

SUMMARY OF THE INVENTION

According to one aspect of the present invention a vehicle security system is provided.

According to a second aspect of the present invention a vehicle security system is provided which overcomes the drawbacks of the prior art as delineated, for example and without limitation, in this Application for Patent.

According to a third aspect of the present invention a vehicle security system is provided and is adapted to allow a user of the system to selectively cause an improved "panic" signal and/or noise signal to be generated. The system is also adapted to cause this improved signal to be generated in response to an alarm or "trip" condition.

According to a fourth aspect of the present invention a vehicle security system is provided which allows a user of the vehicle security system to selectively generate a "panic" signal which is pseudo-random and non-uniform in nature.

These and other features, objects, and advantages of the present invention will become apparent from a reading of the following detailed description of the preferred embodiment of the invention and by reference to the claims when taken in conjunction with the accompanying drawings.

BRIEF DESCRIPTION OF THE DRAWINGS

FIG. 2 is a flow chart illustrating the sequence of operational steps associated with the generation of the improved noise/visual indication features of the vehicle security system shown in FIG. 1.

DETAILED DESCRIPTION OF THE PREFERRED EMBODIMENT OF THE INVENTION

Figure 1:
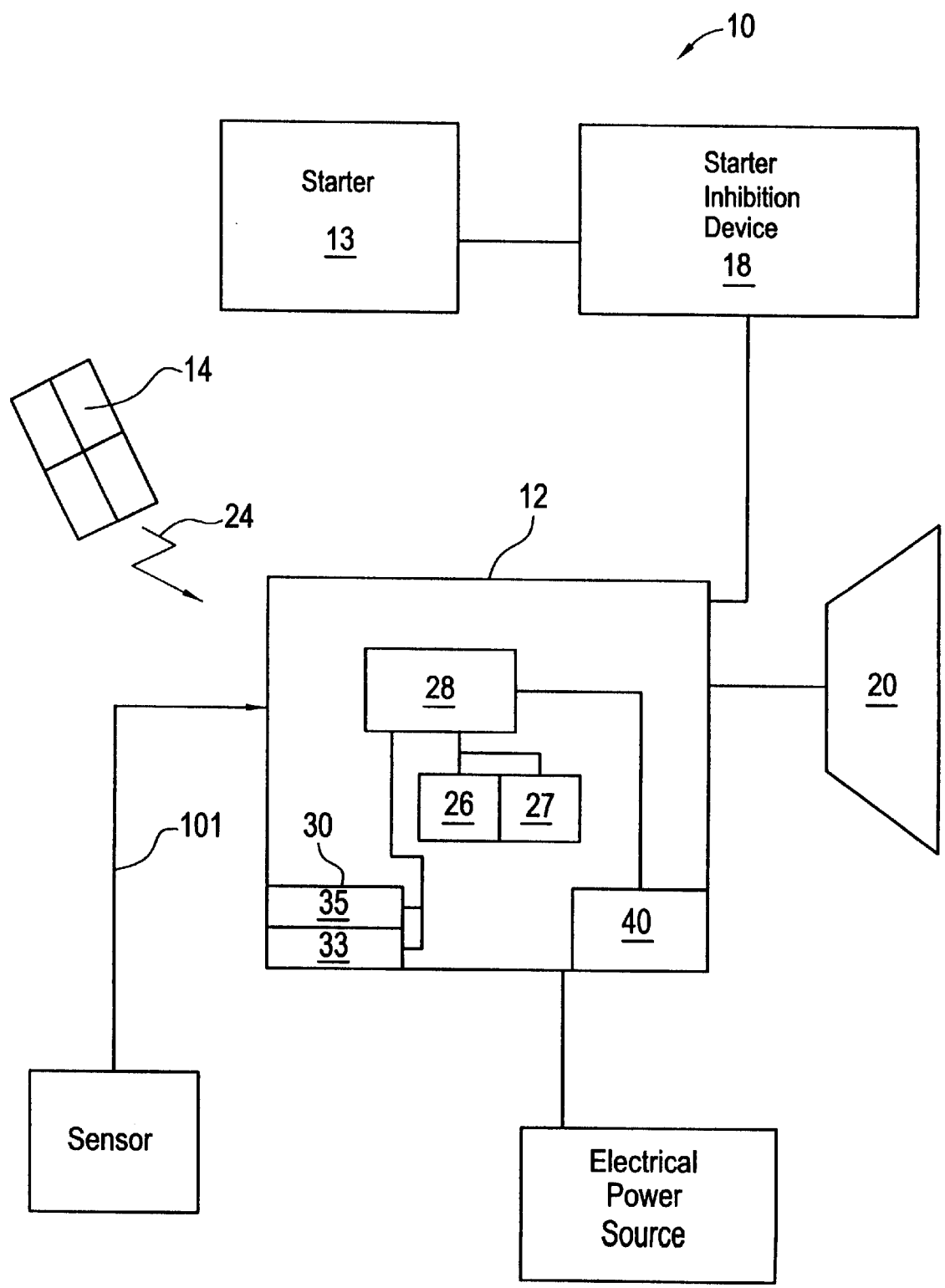
FIG. 1 is a block diagram of a vehicle security system made in accordance with the teachings of the preferred embodiment of the invention.

Referring now to FIG. 1, there is shown a vehicle security system 10 made in accordance with the teachings of the preferred embodiment of the invention. As shown, vehicle security system 10 includes a controller 12 operating under stored program control and adapted to be in selective communication with hand-held transmitter 14. Controller 12 is further electrically and communicatively coupled to a sensor 16, such as and without limitation a shock sensor, a motion sensor, and/or a pin or door switch, and which is adapted to sense attempted tampering with and/or attempted entry into a vehicle and to generate an alarm condition sensing signal (e.g. a "trip" signal 101) to the controller 12.

As is further shown in FIG. 1, system 10 includes a starter inhibition device 18 which is physically, electrically, and communicatively coupled to the controller 12 and to the starter 13 of the vehicle, and which is adapted to selectively prevent and/or diminish the probability of starting the vehicle when the controller 12 is in an "armed" state and an ignition key is turned to the "start" position.

System 10 further includes a siren, horn, and/or visual indicator 20 which is physically, communicatively, and electrically coupled to the controller 12 and which is adapted to selectively receive electrical power from electrical power source 22 (e.g. the battery of the vehicle) through controller 12, effective to cause the siren, horn, and/or visual indicator 20 (e.g. a light emitting diode) to become activated if either a "trip" signal 101 is generated from sensor 16 when the controller is an "armed" state or if a "panic" type command signal 24 is generated by the transmitter 14. It should also be apparent to those of ordinary skill in the art that transmitter 14 is also adapted to selectively place the controller 12 in an "armed" or "disarmed" mode or state. Moreover, it is also specifically contemplated by the Applicants, as stated above, that component 20 may also represent or comprise a visual indicator such as and without limitation, a conventional and commercially available light and/or light bulb.

It should also be appreciated by those of ordinary skill in the art that this "panic" and/or noise making and/or visual generation alarm indication feature may be used in combination with or as part of many different types of vehicle security systems and/or keyless entry systems such as those without sensor 16 and/or starter inhibition device 18.

Moreover, it should equally be apparent to those of ordinary skill in the art that the "panic" and/or noise making and/or visual generation alarm indication feature of this invention may be utilized as part of a "stand-alone" and/or portable system comprising only controller 12 which, in this alternate embodiment, is adapted to only selectively activate the vehicle's horn 20 or some other sound or light generation device in a "panic" manner upon the generation of command signal 24. This controller 12 and device 20 may form, in an alternate embodiment, a portable system for use upon a person or other object, which is desired to be protected and which is adapted to provide this improved noise when the object is moved or tampered with, or when the person moves or activates the controller.

To understand the "panic" and/or "noisemaking" alarm "trip" feature of this invention it is first necessary to discuss the experiment that provided the requisite non-uniform "human-like" noise generation or activation sequence. Specifically, on or about Nov. 1, 1998 several individuals were assembled at the corporate headquarters of Code-Alarm, Inc., which are located at 950 East Whitcomb Drive, Madison Heights, Mich. Specifically, one of these individuals was responsible for timing a sequence of horn activations by the use of a conventional and commercially available oscilloscope which was electrically and physically coupled to the vehicle's horn in a manner effective to electronically capture the horn activation noise and the electrical horn activation signal. Three other individuals were sequentially placed within the same vehicle (a late model Sunbird vehicle manufactured by the General Motors Corporation) and instructed to manually "honk" or activate the vehicle's horn in the best manner they thought would be likely to attract attention to the vehicle and to themselves. The individual responsible for timing these actions, using the oscilloscope, recorded the number of times and the associated time durations that the horn was activated and deactivated, and the total activation and deactivation time for the experiment. It is this "human generated" sound data that is used by Applicants to create their "panic" and alarm triggering sounds and/or visual indications. Pertinent data associated with this experiment is reproduced within Table 1 below and represents the "sounds" that humans "really make" with a horn when desiring to obtain the attention of people in their general vicinity. Applicant believes that this "human generated" sound is quite valuable in attracting the desired attention.

TABLE 1

| Ontime Intervals | 1–100 milli-seconds INT. 1 | 101–200 milli-seconds INT. 2 | 201–400 milli-seconds INT. 3 | 401–600 milli-seconds INT. 4 | 601–800 milli-seconds INT. 5 | 800–1000 milli-seconds INT. 6 | 1001–1400 milli-seconds INT. 7 | 1400+ milli-seconds INT. 8 |
|---|---|---|---|---|---|---|---|---|
| Driver 1 | 9 | 40 | 5 | 3 | 4 | 5 | 5 | 0 |
| Driver 2 | 22 | 68 | 31 | 3 | 4 | 0 | 0 | 0 |
| Driver 3 | 8 | 40 | 8 | 2 | 5 | 3 | 4 | 0 |
| Total | 39 | 148 | 44 | 8 | 13 | 8 | 9 | 0 |
| Percent Chance of Occurring | 14.5% | 55.0% | 16.4% | 3.0% | 4.8% | 3.0% | 3.3% | 0% |

As shown above within Table 1, eight discrete or separate intervals of time were employed. Each of these time intervals is designated by the symbol "INT." Moreover, each interval of time is designated, defined, and/or measured in terms of milli-seconds. The actual measured activation time is shown in Table 1 for each of the three drivers. Moreover, for each interval of "on" or activation time, Applicants calculated the percentage or probability of occurrence, defined as "percent chance of occurring", by adding the total occurrences of activation over each time interval and utilizing this total number as a denominator (e.g. 269). The number of occurrences in each interval represented a unique numerator (e.g. 39 for interval one, 148 for interval two, 44 for interval three, 8 for interval four, 13 for interval five, 8 for interval six, 9 for interval seven, and 0 for interval eight). The "percent chance of occurring" was calculated for each interval by creating a fraction for each interval using the unique numerator for each interval and the denominator which have been earlier specified.

Similarly, the horn/siren deactivation time data was obtained from this experiment. This data is shown in Table 2 below and is measured for each of the timing intervals previously shown and explained with respect to Table 1.

TABLE 2

| Off-time Intervals | 1–100 milli-seconds INT. 1 | 101–200 milli-seconds INT. 2 | 201–400 milli-seconds INT. 3 | 401–600 milli-seconds INT. 4 | 601–800 milli-seconds INT. 5 | 800–1000 milli-seconds INT. 6 | 1001–1400 milli-seconds INT. 7 | 1400+ milli-seconds INT. 8 |
|---|---|---|---|---|---|---|---|---|
| Driver 1 | 27 | 33 | 11 | 0 | 0 | 0 | 0 | 0 |
| Driver 2 | 118 | 10 | 0 | 0 | 0 | 0 | 0 | 0 |
| Driver 3 | 16 | 54 | 0 | 0 | 0 | 0 | 0 | 0 |
| Total | 161 | 97 | 11 | 0 | 0 | 0 | 0 | 0 |
| Percent Chance of Occurring | 59.8% | 36.1% | 4.1% | 0% | 0% | 0% | 0% | 0% |

Specifically, as shown, the total deactivation time was measured (e.g. 269 milli-seconds) and/or calculated for the "off time" intervals and used as a denominator. The numerator for each interval represents the total "off time" occurring in that interval (e.g. 161 milli-seconds in interval one, 97 milli-seconds in interval two, 11 milli-seconds in interval three, and zero milli-seconds in each of the remaining intervals). In this manner, using the unique numerator of each of the intervals and the denominator, each "off time" interval was assigned a unique probability or "percent chance" of occurrence. Applicant discovered that a improved "panic" or alarm "trip" generated noise signal could be created by causing the noise or light emitter to be activated during this same time intervals according to substantially similar probabilities or the "Percent chance of occuring" as delineated within the Tables 1 and 2. That is, Applicants seek to have their vehicle security or portable object/personal protection "noise" or "visual indication" systems to emulate the experimental data.

Applicants determined that a "look up" table embodiment was desirable. To achieve this embodiment controller 12 was selected to contain two conventional and commercially available pseudo-random number generators 26, 27 which are electrically and communicatively coupled to a central processing unit 28.

In the most preferred embodiment of the invention pseudo random number generators 26, 27 are formed and/or constructed within software according to the teachings of the text entitled *Algorithm* which was written by Robert Sedgewick and which was published in 1988 by the Addison Wellesley Publishing Company and which was afforded Library of Congress Number ISBN-0-201-06673-4, and which is fully and completely incorporated herein by reference, word for word and paragraph for paragraph.

Controller 12, in this preferred embodiment of the invention, also comprises and/or contain a memory unit 30 which is communicatively and electrically coupled to processor 28 and which contains the software program necessary to and/or defining the operation of the controller 12 and the system 10. Memory 30 also, in this preferred embodiment of the invention, contains the look-up tables 33, 35 which are used to define the activation and deactivation intervals of siren/horn/visual indicator 20 during a "panic" or "alarm-trip" induced type of operation.

In the preferred embodiment of the invention and utilizing the information obtained in the experiment delineated above, Applicants have found that the following "on-time" or activation intervals should be utilized (see Table 3 below) and that they should have the noted probability of occurrence:

TABLE 3

| Off time | 1–100 INT. 1 | 101–200 INT. 2 | 201–400 INT. 3 | 401–600 INT. 4 | 601–800 INT. 5 | 801–1000 INT. 6 | 1001–1400 INT. 7 | 1400+ INT. 8 |
|---|---|---|---|---|---|---|---|---|
| Prob. | 26.9% | 39.5% | 14.5% | 2.0% | 14.5% | 2% | 0.6% | 0% |

These probability of occurrences, denoted as "Prob." were found to be "close enough" to the probability of occurrences found in Tables 1 and 2 and yet relatively easily implementable in a relatively cost-effective manner. It should be noted that other probability of occurrences may be utilized and that these other dissimilar probability of occurrences are specifically contemplated to fall within and to be encompassed within the scope of the invention.

To achieve these probable occurrences, Applicants utilized, in one embodiment of the invention, an eight value pseudo-random number generator 26. If the horn, siren, or visual indicator is initially de-activated, a pseudo-random number generator value of zero results in the horn being activated for 60 milli-seconds. A value of one causes the siren/horn/light to be activated for about 180 milli-seconds. A value of two, three, or four, results in the horn, siren, or light 20 being activated for respective time periods of 260 milli-seconds, 100 milli-seconds and 120 milli-seconds. A value of five results in the horn, siren, or light 20 being activated for a period of 200 milli-seconds. A value of six, according to the preferred embodiment of the invention causes the siren/horn/light indicator 20 to become activated for 600 milli-seconds. A value of seven causes processor 28 to read the value of system clock or timer 40 and to activate the horn/light/siren 20 for the amount of time specified by the time 40, which may vary from one to 1400 milli-seconds. In this manner, some probability of occurrence is allocated to all of the time intervals. These values are contained within look-up table 33 which is accessed by controller 12 of the receipt of a value from generator 26.

If the horn or siren is initially activated, a pseudo-random number between 0 and 3 is generated by generator 27 and read by controller 12 and used to "read" the look-up table 35 for the purpose of defining the time intervals over which the horn or siren or light indicator 20 is to be deactivated. A value of zero causes the controller 12 to deactivate the component 20 for 60 milli-seconds. A value of one causes the controller 12 to deactivate the component 20 for 180 milli-seconds. A value of two causes the controller 12 to deactivate the component 20 for 260 milli-seconds. A value of three causes the controller 12 to deactivate the component 20 for 100 milli-seconds. These values are contained in look-up table 35. In the foregoing manner, as should be appreciated by those of ordinary skill in this art, the "panic" and/or "alarm-tripping" feature of this vehicle security system 10 is pseudo-random or "human-like". Moreover, the activation of component 20 is achieved, by controller 12 and is accomplished by selectively allowing electrical power to reach component 20 from source 22 (e.g. "activating component 20") or by preventing such power from reaching the component 20 (e.g. "deactivating component 20"). To further understand the "panic" or "alarm tripping" operation of system 10 reference should now be made to FIG. 2.

As shown in flow chart 100, the sequence of operation begins with a receipt by controller 12 of a "panic" signal 24 from controller 12 or the receipt of an "alarm trip" signal by sensor 16. This initialization sequence is shown in step 102. Step 102 is followed by step 104 in which controller 12 receives a value from pseudo-random number generator 26 and uses this value to access look-up table 33. Step 106 follows Step 104. In step 106, the horn/siren/visual indicator component 20 is activated for the time specified within the look-up table 33. Step 108 follows step 106 and, in this step, controller 12 receives a value from pseudo-random number generator 35 and uses this value to access deactivation look-up table 35. Step 110 follows step 108 and, in this step, controller 12 deactivates component 20 for the time specified with look-up table 35. Step 112 follows step 110 and, in this step, controller 12 determines whether 30 seconds has elapsed since the beginning of step 106. Other time periods may be used. If this time has not elapsed, step 112 is followed by step 104. Alternatively step 112 is followed by step 114 which causes controller 12 to end the sequence. It should be apparent that the foregoing discussion assumes that component 20 is initially deactivated in step 104 become interchanged as do in step 110 and 106. It should be equally apparent that within the time interval specified by step 112 (e.g. 30 seconds), controller 12 "toggles" between look-up tables 33 and 35 to provide activation and deactivation values for component 20. It is this toggling which allows these human-like sounds to be produced in this embodiment of the invention.

In the foregoing manner, the horn or other audible or visual indicator 20 devices produce human-like or non-uniform sounds or visual indicators which are generated in response to "panic" or "alarm trip" signals and which are human-like and pseudo-random in nature.

It is to be understood that the inventions are not limited to the exact construction or method illustrated but that various changes and/or modifications may be made without departing from the spirit or the scope of the inventions as more fully described in this Application for Patent.

What is claimed is:

1. A vehicle security system comprising:
   an audible indicator; and
   a controller having a memory unit containing data derived from experimentation with at least one human subject, said data corresponding to previously generated horn activation signals which have been generated by several individuals and which have been previously probabilistically analyzed and said controller being effective to selectively activate said audible indicator by use of said data, thereby causing said audible indicator to generate a signal.

2. The vehicle security system of claim 1 wherein said audible indicator comprises a siren.

3. The vehicle security system of claim 1 wherein said audible indicator comprises a horn.

4. The vehicle security system of claim 1 wherein said data comprises a plurality of time periods during which said audible indicator is activated and deactivated.

5. The vehicle security system of claim 1 further comprising:
   a remote transmitter which selectively generates a command signal; and
   wherein said controller is further effective to receive said command signal and to activate said audible indicator in response to said receipt of said command signal.

6. The vehicle security system of claim 1 wherein said data is stored within at least one look-up table held within said memory unit.

* * * * *